United States Patent
Oya (10) Patent No.: US 8,023,201 B2
(45) Date of Patent: Sep. 20, 2011

(54) RETRACTABLE LENS BARREL WITH HIGH SHOCK RESISTANCE

(75) Inventor: Takahiro Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/852,570

(22) Filed: Aug. 9, 2010

(65) Prior Publication Data

US 2011/0038059 A1 Feb. 17, 2011

(30) Foreign Application Priority Data

Aug. 17, 2009 (JP) ................................. 2009-188423

(51) Int. Cl.
  *G02B 15/14* (2006.01)
  *G02B 7/02* (2006.01)
(52) U.S. Cl. ........................................ 359/700; 359/813
(58) Field of Classification Search .......... 359/699–701, 359/703–704, 811, 813, 815, 819, 822–823, 359/826–827, 829–830; 396/72, 344, 349
See application file for complete search history.

(56) References Cited

U.S. PATENT DOCUMENTS

| | | | |
|---|---|---|---|
| 7,463,824 B2 | 12/2008 | Yumiki et al. | |
| 7,515,360 B2* | 4/2009 | Miyazawa et al. | 359/811 |
| 7,689,110 B2 | 3/2010 | Yumiki et al. | |
| 7,733,577 B2* | 6/2010 | Kobayashi | 359/700 |
| 2003/0180036 A1* | 9/2003 | Horiuchi et al. | 396/72 |
| 2006/0182432 A1 | 8/2006 | Yumiki | |
| 2009/0091850 A1 | 4/2009 | Yumiki et al. | |

FOREIGN PATENT DOCUMENTS

JP 2005-128188 5/2005

* cited by examiner

*Primary Examiner* — Dawayne Pinkney
(74) *Attorney, Agent, or Firm* — Cowan, Liebowitz & Latman, P.C.

(57) ABSTRACT

A retractable lens barrel that improves shock resistance without obstructing miniaturization. In the retractable lens barrel, pins formed in the lens barrel are engaged with grooves formed in a cam ring, and the lens barrel is caused to move in a direction of an optical axis by rotation of the cam ring. The pins include a cam pin for moving the lens barrel, and a slip-off preventive pin for preventing the cam pin from slipping off the groove. The grooves include a cam groove with which the cam pin is engaged, and a slip-off preventive groove with which the slip-off preventive pin is engaged. In an area close to a retracted position of the lens barrel, the cam groove and the slip-off preventive groove overlap to be shared grooves with which the cam pin and the slip-off preventive pin are engaged.

4 Claims, 7 Drawing Sheets

RETRACTABLE LENS BARREL WITH HIGH SHOCK RESISTANCE

BACKGROUND OF THE INVENTION

1. Field of the Invention

The present invention relates to a retractable lens barrel, and in particular to a zooming mechanism in which cam pins are engaged with cam grooves.

2. Description of the Related Art

Conventionally, optical apparatuses such as digital cameras having a zoom lens barrel of a retractable type (hereinafter referred to as a retractable lens barrel) have been in widespread use. As a zoom lens extension mechanism in a retractable lens barrel, there has been known a drive mechanism that engages cam pins formed in the lens barrel with cam grooves formed in a movable cam ring, and rotatively drives the movable cam ring to move the lens barrel forward and backward in a direction of an optical axis along the cam grooves. In such a zoom lens extension mechanism in which cam pins are engaged with cam grooves, it is necessary to prevent the cam pins from slipping off the cam grooves to render the lens barrel incapable of moving forward and backward when external force is applied.

As this slip-off preventive technique, there has been proposed, for example, a technique described in Japanese Laid-Open Patent Publication (Kokai) No. 2005-128188. According to the technique described in Japanese Laid-Open Patent Publication (Kokai) No. 2005-128188, a slip-off preventive pin as well as a cam pin are formed in a lens barrel, a cam groove and a slip-off preventive groove that are to be engaged with the respective pins are formed in a movable cam ring, and a first projection is formed on one side of the slip-off preventive groove in a direction of an optical axis. With this arrangement, the slip-off preventive pin comes into abutment with the first projection during extension of a zoom lens so that the cam pin can be prevented from slipping off the cam groove.

However, according to the technique described in Japanese Laid-Open Patent Publication (Kokai) No. 2005-128188, the cam groove and the slip-off preventive groove are identical in shape, and also, the cam groove and the slip-off preventive groove are formed as separate grooves independent of each other.

Thus, according to the technique described in Japanese Laid-Open Patent Publication (Kokai) No. 2005-128188, the cam groove and the slip-off preventive groove must be spaced out in the direction of the optical axis in order that the lens barrel can move in synchronization in the direction of the optical axis, in other words, in order that cam paths can be the same.

For this reason, according to the technique described in Japanese Laid-Open Patent Publication (Kokai) No. 2005-128188, the movable cam ring is long in the direction of the optical axis, and this presents an obstacle in miniaturizing the lens barrel, and by extension an optical apparatus such as an image pickup apparatus having the lens barrel.

SUMMARY OF THE INVENTION

The present invention provides a retractable lens barrel that improves shock resistance without obstructing miniaturization.

Accordingly, in a first aspect of the present invention, there is provided a retractable lens barrel in which pins formed in the lens barrel are engaged with grooves formed in a cam ring, and the lens barrel is caused to move in a direction of an optical axis by rotation of the cam ring, comprising a cam pin for moving the lens barrel, a slip-off preventive pin for preventing the cam pin from slipping off the groove, a cam groove with which the cam pin is engaged, and a slip-off preventive groove with which the slip-off preventive pin is engaged, wherein in an area close to a retracted position of the lens barrel, the cam groove and the slip-off preventive groove overlap to be shared grooves with which the cam pin and the slip-off preventive pin are engaged.

According to the present invention, shock resistance of the retractable lens barrel can be improved without obstructing miniaturization.

Further features of the present invention will become apparent from the following description of exemplary embodiments (with reference to the attached drawings).

BRIEF DESCRIPTION OF THE DRAWINGS

FIGS. 1A and 1B are external perspective views showing a digital camera having a retractable lens barrel according to an embodiment of the present invention, in which FIG. 1A shows a retracted state, and FIG. 1B shows an extended state.

DESCRIPTION OF THE EMBODIMENTS

The present invention will now be described in detail with reference to the drawings showing an embodiment thereof.

Figure 1A:
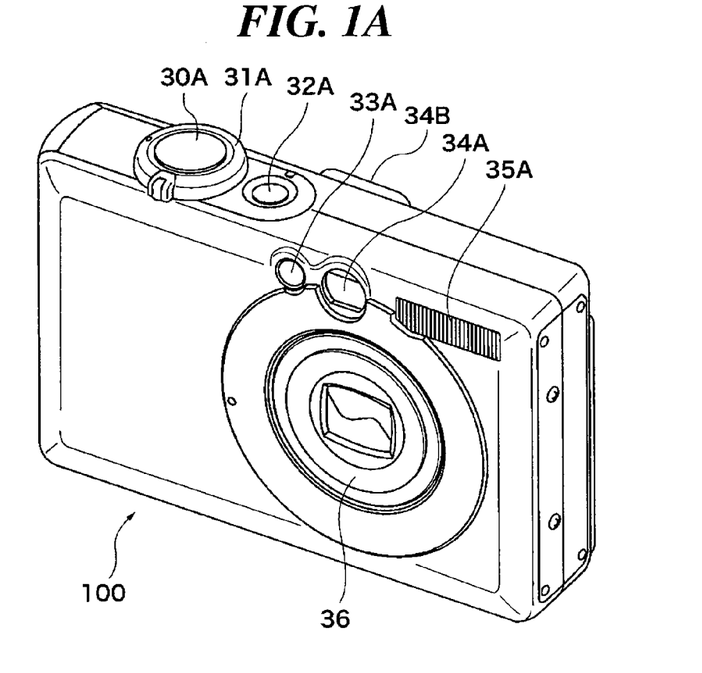
Figure 1B:
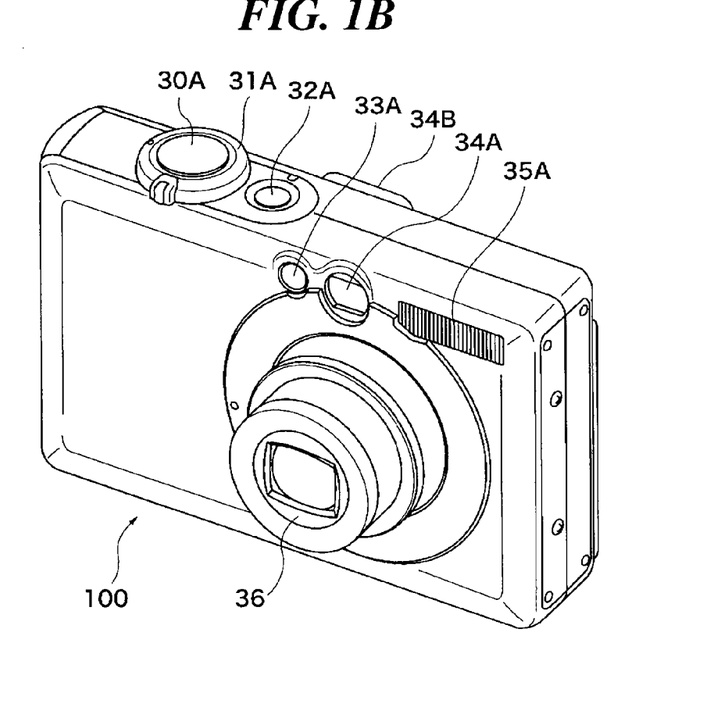

FIGS. 1A and 1B are external perspective views showing a digital camera having a retractable lens barrel according to an embodiment of the present invention, in which FIG. 1A shows a retracted state of the retractable lens barrel, and FIG. 1B shows an extended state of the retractable lens barrel.

Referring to FIGS. 1A and 1B, an auxiliary light window 33A, a finder window 34A, and a strobe light window 35A as well as the retractable lens barrel 36 are mounted in a front surface of the digital camera 100.

Auxiliary light is irradiated toward a subject from the auxiliary light window 33A at a time of photometric measurement and distance measurement. An optical image of a subject is taken into an interior of the camera from the finder window 34A, and the subject image can be viewed via a finder eyepiece 34B provided in a rear surface of the digital camera 100. Strobe light is irradiated toward a subject from the strobe light window 35A in shutter opening. The retractable lens barrel 36 is extended toward a subject as shown in FIG. 1B at a time of changing an angle of view.

A release switch button 30A, a zoom dial 31A, and a power switch button 32A are mounted in an upper surface of the digital camera 100. It should be noted that a display 38 and buttons of an operation switch group 39 (see FIG. 2) as well as the finder eyepiece 34B are provided in the rear surface of the digital camera 100.

Figure 2:
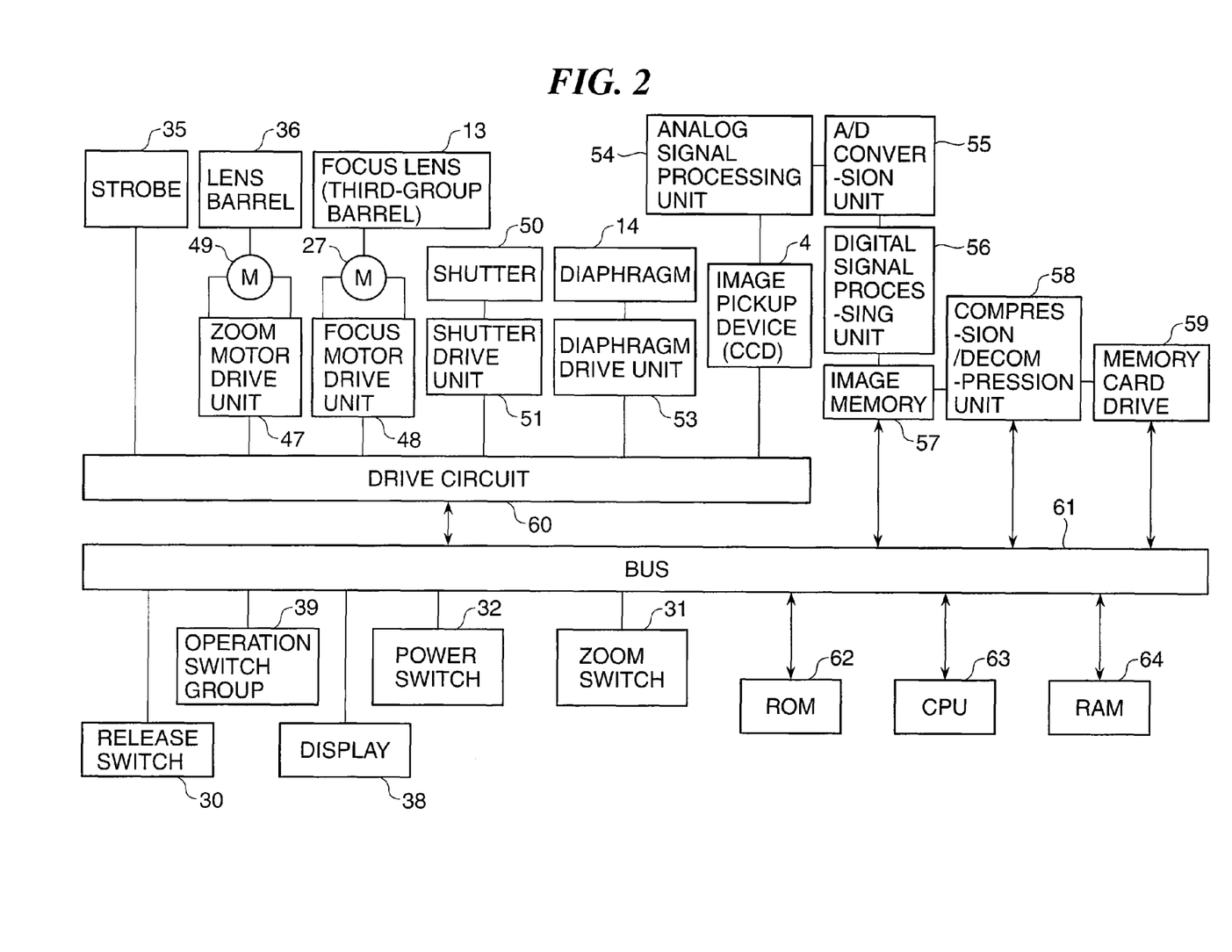
FIG. 2 is a block diagram schematically showing a hardware configuration of the digital camera.

The release switch button 30A is linked to a release switch 30 (see FIG. 2). It should be noted that the release switch 30 has a first switch that is turned on with a first depression stroke of the release switch button 30A and a second switch that is turned on with a second depression stroke of the release switch button 30A. Turning-on of the first switch causes photometric measurement and distance measurement using the above mentioned auxiliary light to be performed. Also, turning-on of the second switch causes a shutter 50 (see FIG. 2) to be opened, so that shooting using the above mentioned strobe light is performed.

The zoom dial 31A is linked to a zoom switch 31 (see FIG. 2) having a plurality of fixed contacts, and a zooming rate is determined by turning-on of a switch according to the rotation amount of the zoom dial 31A. In this case, the extension amount of the retractable lens barrel 36 is determined according to the zooming rate. The power switch button 32A is linked to a power switch 32 (see FIG. 2). When the power switch 32 is off, the retractable lens barrel 36 lies in the retracted state shown in FIG. 1A.

Referring next to FIG. 2, a description will be given of an outline of a hardware configuration of the digital camera 100. The digital camera 100 has a drive circuit 60 and a bus 61. A strobe 35, a zoom motor drive unit 47, a focus motor drive unit 48, a shutter drive unit 51, a diaphragm drive unit 51, and an image pickup device 4 are connected to the drive circuit 60.

The release switch 30, the operation switch group 39, the display 38, the power switch 32, the zoom switch 31, an image memory 57, a compression/decompression unit 58, a memory card drive 59, a ROM 62, a CPU 63, and a RAM 64 are connected to the bus 61.

The digital camera 100 is controlled by the CPU 63 executing control programs stored in the ROM 62. On this occasion, the CPU 63 uses the RAM 63 as a work area or the like.

The zoom motor drive unit 47 controls the rotation of a zoom motor 49 under the control of the CPU 63, to thereby rotate a drive ring 24 (see FIGS. 3 and 4) in the lens barrel 36. The focus motor drive unit 48 controls the rotation of an AF motor 27 under the control of the CPU 63, to thereby move a focus lens (third-group lens barrel 13: see FIGS. 3 and 4) in the direction of the optical axis. The diaphragm drive unit 53 controls the operation of a diaphragm 14 to change its aperture under the control of the CPU 63.

It should be noted that the display 38 is comprised of an LCD or the like and capable of displaying image data stored in the image memory 57 and image data read from a memory card via the memory card drive 59. In this case, so-called digital zooming, i.e. zooming-in or out of image data displayed on the display 38 may be performed by operating the zoom switch 31. The operation switch group 39 includes various switches such as a switch for selecting an operation mode of the digital camera 100, for example, a shooting mode, a replay mode, or a video shooting mode.

Although in the present embodiment, a CCD is used as the image pickup device 4, another image pickup device such as a CMOS may be used. An analog signal processing unit 54, an A/D conversion unit 55, a digital signal processing unit 56, and the image memory 57 are sequentially connected in a stage subsequent to the CCD 4. It should be noted that other devices such as an LED for emitting auxiliary light are also connected to the bus 61 although they are not illustrated.

Next, a description will be given of how the digital camera 100 operates. When the power switch 32 is turned on by depression of the power button 32A, the CPU 63 reads a control program from the ROM 62 to start an initial operation.

In this initial operation, the CPU 63 brings the lens barrel 36 into a shooting standby state by moving the same into a predetermined shooting permitting area.

When the first switch of the release switch 30 is turned on by depression of the release button 30A, the CPU 63 measures the brightness of a subject after emitting auxiliary light, and determines an aperture value of the diaphragm 14 and a shutter speed of the shutter 50 based on the measured brightness. On this occasion, the CPU 63 can automatically determine whether or not to cause the strobe 35 to flash. However, it may be arranged such that by operating a predetermined switch of the operation switch group 39, a user gives in advance an instruction as to whether or not to force the strobe 35 to flash, and in accordance with the instruction, the CPU 63 determines whether or not to cause the strobe 35 to flash.

Then, the CPU 63 measures the distance between the subject and the digital camera 100, and in accordance with the measurement result, the focus motor drive unit 48 rotates the AF motor 27 to thereby move the third-group barrel (focus lens) 13 to a focusing position. Also, when a certain switch of the zoom switch 31 is turned on by rotation of the zoom dial 31A, the CPU 63 causes the zoom motor drive unit 47 to move the lens barrel 36 to a zoom position corresponding to the turned-on switch.

When the second switch of the release switch 30 is turned on by depression of the release button 30A, the CPU 63 causes the shutter drive unit 51 to open and close the shutter 50, to thereby cause a subject image (optical image) to enter the CCD 4. As a result, electric charge corresponding to the amount of light of the subject image is stored in the CCD 4, and the electric charge is output as an analog image signal to the analog signal processing unit 54.

The analog signal processing unit 54 performs analog signal processing such as removal of noise components from the input analog image signal, and outputs the resulting analog image signal to the A/D conversion unit 55. The A/D conversion unit 55 converts the input analog image signal into a digital image signal, and outputs the digital image signal to the digital signal processing unit 56.

The digital signal processing unit 56 performs digital signal processing such as a $\gamma$ correcting process on the input digital image signal, and stores the resulting digital image signal as digital image data in the image memory 57. The image data stored in the image memory 57 can be subjected to a compression process such as JPEG compression by the compression/decompression unit 58 in response to a switch operation of the operation switch group 39, and stored in a memory card.

Referring next to FIGS. 3 to 7D, a detailed description will be given of an arrangement of the retractable lens barrel 36.

Figure 3:
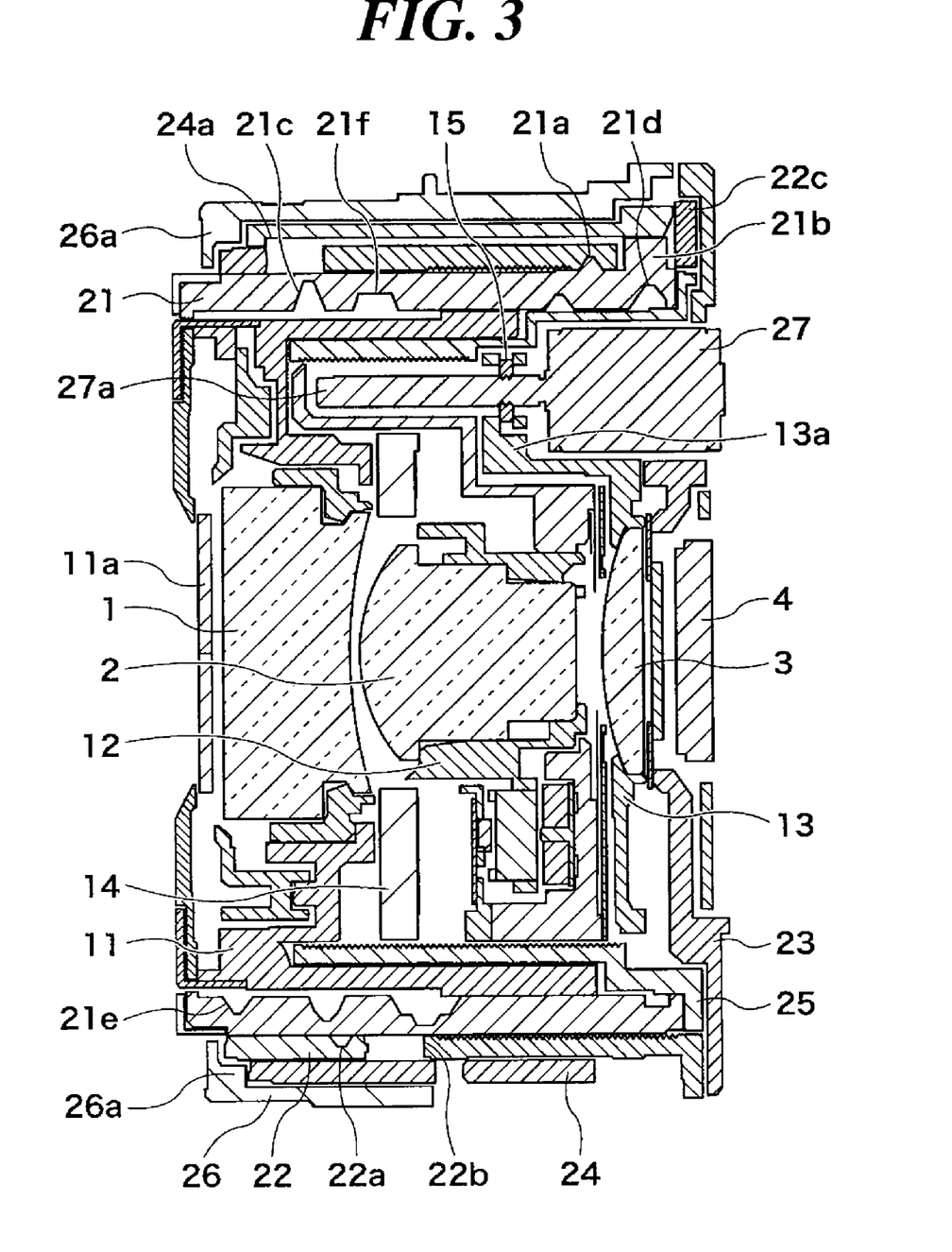
FIG. 3 is a cross-sectional view showing the lens barrel mounted in the digital camera (retracted state).
Figure 4:
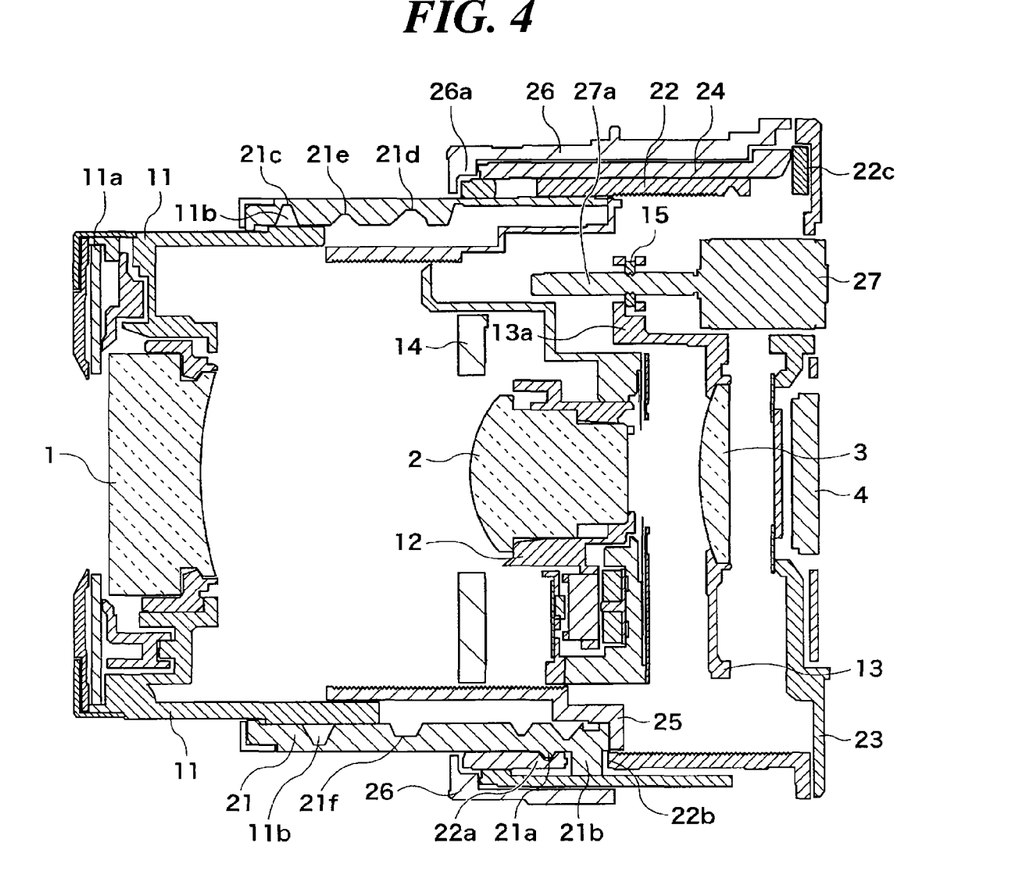
FIG. 4 is a cross-sectional view showing the lens barrel mounted in the digital camera (extended state).

In FIGS. 3 and 4, a reference numeral 1 denotes a first-group lens, a reference numeral 2 denotes a second-group lens having a zooming function, a reference numeral 3 denotes a third-group lens responsible for focusing and correction of an image plane, and a reference numeral 4 denotes a CCD as an image pickup device.

Reference numerals 11, 12, and 13 denote a first-group barrel, a second-group barrel, and the third-group barrel that movably hold the first-group lens 1, the second-group lens 2, and the third-group lens 3, respectively, in the direction of the optical axis. The first-group barrel 11 and the second-group barrel 12 are held by a movable cam ring 21. Cam grooves are formed on an inner periphery of the movable cam ring 21. A reference numeral 14 denotes a diaphragm that controls the amount of incident light and is held by the movable cam ring 21 similarly to the first-group barrel 11 and the second-group barrel 12.

A reference numeral 22 denotes a fixed cylinder, and cam grooves formed on an inner periphery thereof movably hold the movable cam ring 21. A reference numeral 23 denotes a CCD holder that holds the CCD 4 and to which the fixed cylinder 22 is fixed. The reference numeral 24 denotes a drive ring that rotates the movable cam ring 21, and a reference numeral 25 denotes a straight advance guide ring that inhibits the first-group barrel 11 and the second-group barrel 12 from rotating and causes them to advance straight. A reference numeral 26 denotes a cover cylinder, which is fixed to the CCD holder 23 and inhibits the drive ring 24 from moving in the direction of the optical axis.

Next, a description will be given of how the lens barrel 36 operates. The movement of the drive ring 24 in the direction of the optical axis is inhibited by a flange portion 26a formed in the cover cylinder 26 and a flange portion 22c formed at a rear end of the fixed cylinder 22. Thus, when rotative force from the zoom motor 49 is transmitted to a gear unit provided on an outer periphery of the drive ring 24 via a gear system, not shown, the drive ring 24 rotates about the optical axis.

Three straight advance guide grooves 24a having a uniform width in the direction of the optical axis are formed in an inner peripheral surface of the drive ring 24. Also, three cam pins 21a are implanted in an outer periphery of the movable cam ring 21 and engaged with three cam grooves 22a formed in an inner peripheral surface of the fixed cylinder 22.

Three drive pins 21b are implanted substantially behind the cam pins 21a. The three drive pins 21b, which penetrate respective three guide holes 22b formed in the fixed cylinder 22, are slidably engaged with the three linear guide grooves 24a formed in the drive ring 24.

With this arrangement, when the drive ring 24 rotates, its rotative force is transmitted to the movable cam ring 21 through the drive pins 21b, causing the movable cam ring 21 to rotate. As a result of the rotation, the movable cam ring 21 moves in the direction of the optical axis along the cam grooves 22a of the fixed cylinder 22.

The linear guide ring 25 is inhibited from moving in the direction of the optical axis relative to the movable cam ring 21. Also, the linear guide ring 25 is engaged with a straight advance guide groove, not shown, provided on an inner peripheral side of the fixed cylinder 22 such that it can advance straight. Thus, the straight advance guide ring 25 is inhibited from moving in the rotational direction. Thus, when the movable cam ring 21 moves in the direction of the optical axis along the cam groove 22a of the fixed cylinder 22 while rotating, the straight advance guide ring 25 follows the movable cam ring 21 in the direction of the optical axis and moves only in the direction of the optical axis.

The first-group barrel 11, the second-group barrel 12, and the diaphragm 14 are held in cam grooves 21c, 21d, and 21e, respectively, formed in the inner periphery of the movable cam ring 21. The first-group barrel 11, the second-group barrel 12, and the diaphragm 14 are inhibited from rotating by the straight advance guide ring 25, and hence when the movable cam ring 21 rotates, the first-group barrel 11, the second-group barrel 12, and the diaphragm 14 move only in the direction of the optical axis along the cam grooves 21c, 21d, and 21e.

The first-group barrel 11 is provided with a lens barrier 11a, and an optical path of a shooting optical system is blocked by the lens barrier 11a. The second-group barrel 12 is provided with a shutter 50 and a camera-shake compensation mechanism (not shown). The shutter 50 and the camera-shake compensation mechanism move in the direction of the optical axis integrally with the second-group barrel 12.

The third-group barrel 13 is caused to move in the direction of the optical axis by a lead screw mechanism. Specifically, the AF motor 27 is fixed to the CCD holder 23, and a lead screw 27a is mounted on a rotary shaft of the AF motor 27. The lead screw 27a is screwed into a nut 15 fixed to a distal end of an arm portion 13a of the third-group barrel 13. Thus, the third-group barrel 13 moves in the direction of the optical axis as the lead screw 27a rotates.

Figure 5:
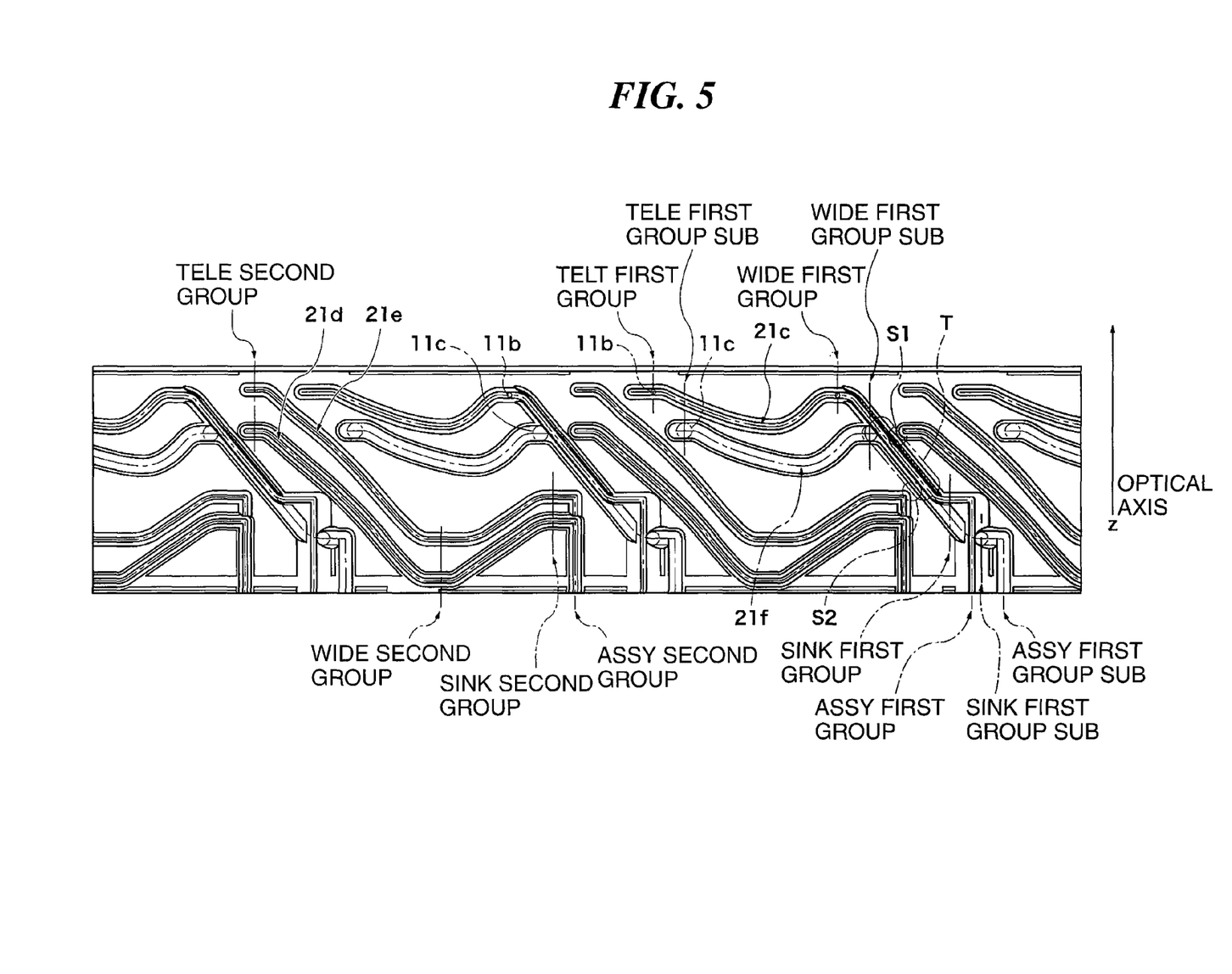
FIG. 5 is a developed view showing an inner peripheral surface of a movable cam ring in the lens barrel.
Figure 6:
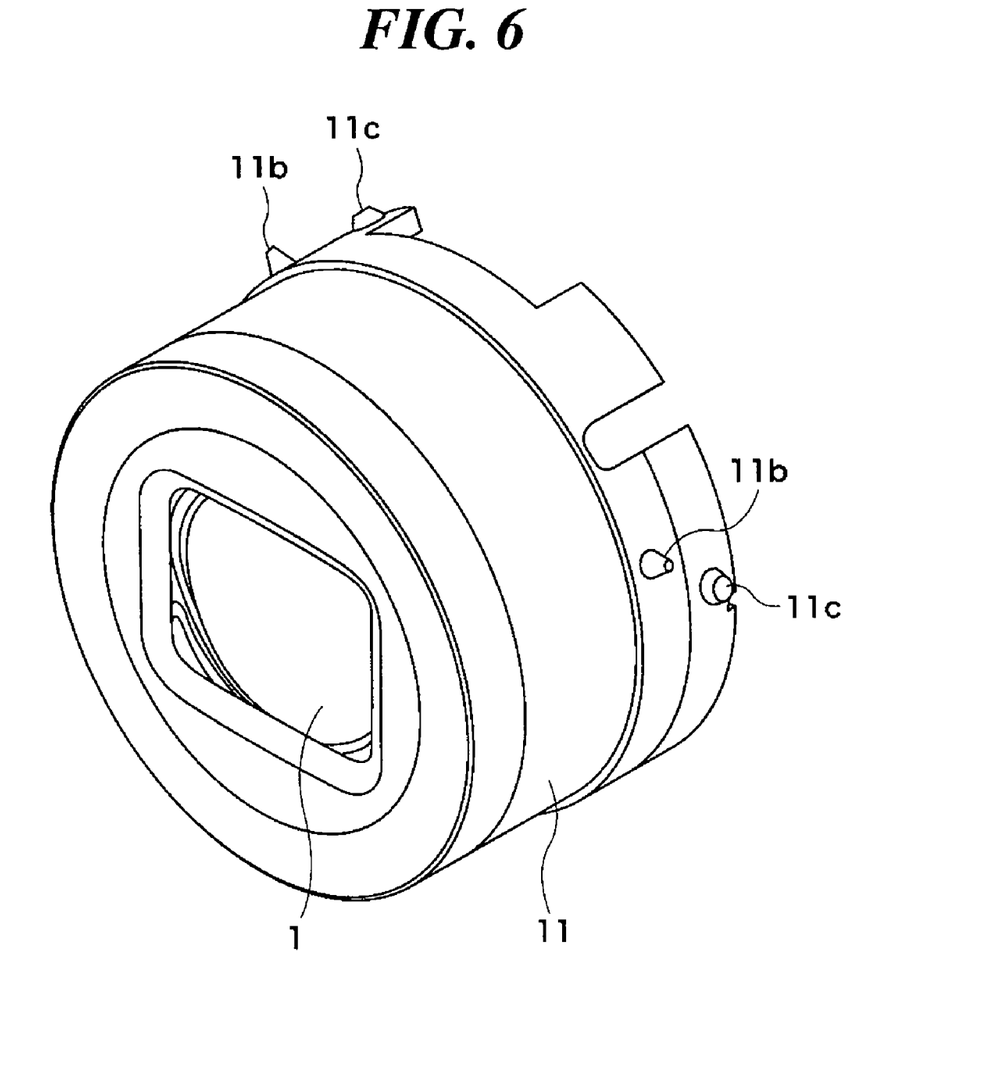
FIG. 6 is an external perspective view showing a first group barrel in the lens barrel.

Referring next to FIGS. 5 to 7D, a description will be given of a cam pin slip-off preventive mechanism of the first-group barrel 11. FIG. 5 is a developed view showing an inner peripheral surface of the movable cam ring 21. Referring to FIG. 5, three first-group cam grooves 21c, three second-group cam grooves 21d, and three diaphragm cam grooves 21e are formed in the inner periphery of the movable cam ring 21.

Further, three slip-off preventive sub cam grooves 21f for preventing the cam pins 11b of the first-group barrel 11 engaged with the first-group cam grooves 21c from slipping off the first-group cam grooves 21c are formed in the inner periphery of the movable cam ring 21. It should be noted that the three first-group cam grooves 21, three second-group cam grooves 21d, three diaphragm cam grooves 21e, and three slip-off preventive sub cam grooves 21f are formed at equal intervals of 120 degrees.

In the cam grooves 21c, 21d, 21e, and 21f, there exist "ASSY" that is an assembly phase, "SINK" that is a retracted position when power is off, and a wide-angle end "WIDE" and a telephoto end "TELE" that are shooting positions. The cam grooves 21c, 21d, 21e, and 21f are opened at a rear end of the movable cam ring 21 in the assembly phase "ASSY".

An area from "SINK" to "TELE" except for the assembly phase "ASSY" is a regular-use area, and in this regular-use area, an area from "SINK" to "WIDE" is an extension area, and an area from "WIDE" to "TELE" is a zooming area The cam path of the sub cam groove 21f as the slip-off preventive groove is substantially the same as the cam path of the first-group cam groove 21c. Also, the sub cam groove 21f is formed behind the first-group cam groove 21c in the direction of the optical axis (camera inner side), and differs in phase (position in a horizontal direction as viewed in FIG. 5) from the first-group cam groove 21c.

In an area T which is a part of the extension area, that is, an area T close to the retracted position, the cam paths in the sub cam groove 21f and the first-group cam groove 21c overlap in such a manner as to join together to be shared grooves with which the sub pin (slip-off preventive pin) 11c and the cam pin 11b are engaged.

As a result, a space S1 between the first-group cam groove 21c and the sub cam groove 21f (shared grooves) and the second-group cam groove 21d and a space S2 between the first-group cam groove 21c and the sub cam groove 21f (shared grooves) and the diaphragm cam groove 21e can be narrowed.

It should be noted that the above spaces S1 and S2 include spaces in both the direction of the optical axis (Z-direction) and the direction perpendicular to the direction of the optical axis (phase). Narrowing the spaces S1 and S2 not only means that the length of the lens barrel 36 in the direction of the optical axis can be reduced, but also means that the diameter of the lens barrel 36 can be reduced.

Thus, in the present embodiment, even though the slip-off preventive sub cam grooves 21f are newly formed in the retractable lens barrel so as to improve shock resistance, miniaturization is not obstructed. In other words, because in the area T close to the retracted position, the slip-off preventive sub cam groove 21f and the first-group cam groove 21c are made to overlap in such a manner as to join together to be shared grooves, the sub cam groove 21f can be formed without affecting other cam grooves, and hence the freedom in the arrangement of cam grooves can be increased.

As a result, even though the slip-off preventive sub cam grooves 21f are newly formed, the retractable length and the diameter of the lens barrel 36 are not increased, and hence the lens barrel 36, and by extension the digital camera 100 can be downsized while the strength of the lens barrel 36 against external force can be enhanced.

Referring next to FIGS. 7A to 7D, a description will be given of the relationship between the first-group cam groove 21c and the slip-off preventive sub cam groove 21f and the cam pin 11b and the sub cam pin 11c that are engaged with those cam grooves.

Figure 7A:
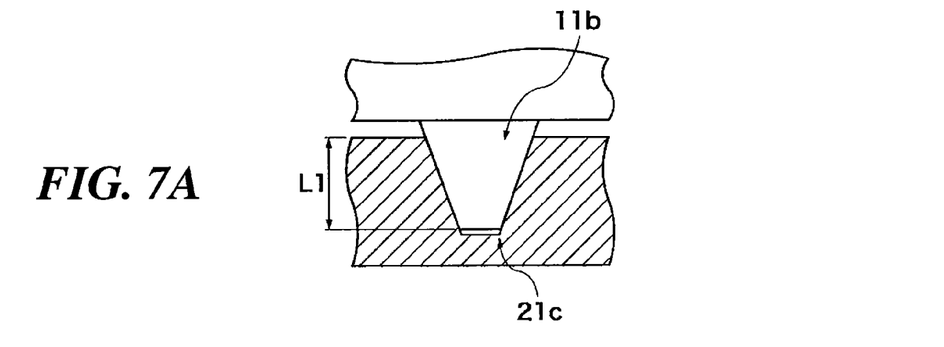
FIGS. 7A to 7D are diagrams useful in explaining the relationship between a cam groove and a sub cam groove formed in the movable cam ring and a cam pin and a sub cam pin engaged with those cam grooves.
Figure 7B:
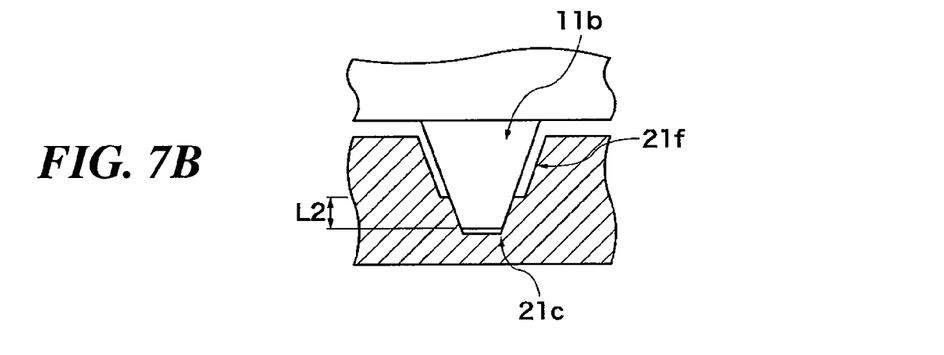
Figure 7C:
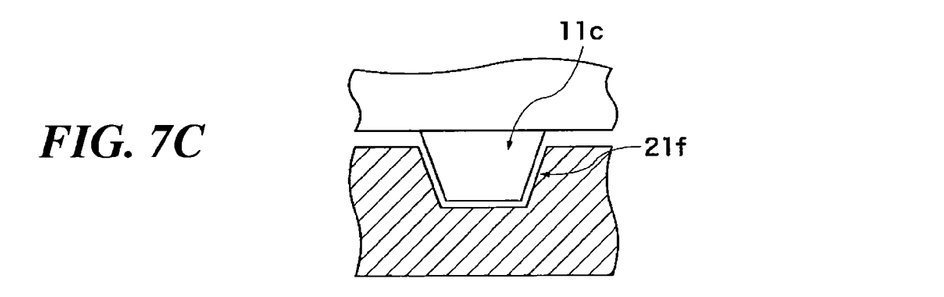

FIG. 7A shows the relationship between the cam pin 11b and the first-group cam groove 21c, and FIG. 7B shows the relationship between the cam pin 11b and the first-group cam groove 21c in the area T close to the retracted position. FIG. 7C shows the relationship between the sub pin 11c and the slip-off preventive sub cam groove 21f, and FIG. 7D shows the relationship between the sub pin 11c and the slip-off preventive sub cam groove 21f in the area T close to the retracted position.

Figure 7D:
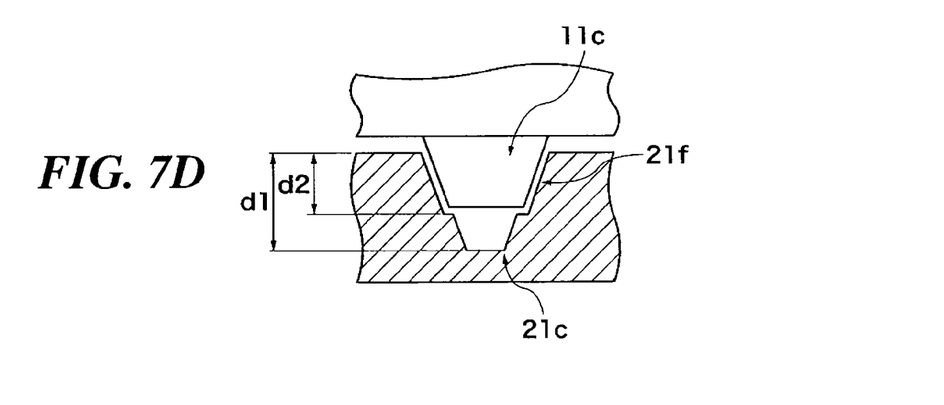

As shown in FIG. 7D, the depths of the cam groove 21c and the sub cam groove 21f in the area T close to the retracted position, that is, in a shared groove area are d1 and d2, respectively, and the cam groove 21c is deeper than the sub cam groove 21f. Because two cam grooves have different depths in the shared groove area, the cam paths can be shared without impairing the extending function and the slip-off preventing function of the first-group barrel 11.

As shown in FIG. 7A, in an area other than the area T close to the retracted position, that is, in an area other than the shared groove area, the cam pin 11b allows an engagement amount L1 required keep from slipping off the first-group cam groove 21c as per normal. However, as shown in FIG. 7B, in the area T close to the retracted position (shared groove area), the sub cam groove 21f is wider than the first-group cam groove 21c, and hence the engagement amount of the cam pin 11b is L2 smaller than L1.

However, the cam pin 11b is susceptible to external force due to drop or the like in the zooming area from "WIDE" to "TELE", which is a shooting area, and is slightly susceptible to external force in the shared groove area. Thus, in the shared groove area, it is only necessary to allow an engagement amount required for moving forward and backward in the direction of the optical axis along the first-group cam groove 21c, and even when the engagement amount of the cam pin 11b is L2 smaller than L1, there is no almost possibility that the cam pin 11b slips off the first-group cam groove 21c.

As shown in FIGS. 7C and 7D, the relationship between the sub pin 11c and the slip-off preventive sub cam groove 21f is uniform in all the areas irrespective of whether or not they are in the shared groove area. Also, to eliminate friction resistance between the sub pin 11c and the sub cam groove 21f so as to prevent the movement of the first-group barrel 11 from being obstructed, the sub pin 11c does not come into abutment with the sub cam groove 21f and is kept a fixed distance away from the sub cam groove 21f in a normal usage state where no shock is applied.

Only when subjected to external force, the sub pin 11c comes into abutment with a side face of the sub cam groove 21f to disperse external force applied to the cam pin 11b, thus preventing the cam pin 11b from slipping off the first-group cam groove 21c.

It should be noted that as shown in FIGS. 6 and 7A to 7D, the cam pins 11b, the first-group cam grooves 21c, the sub pins 11c, and the sub cam grooves 21f are constructed as helicoids of which distal ends are trapezoidal. From this aspect as well, the strength of the lens barrel 36 against external force can be enhanced, and the lens barrel 36, and by extension the digital camera 100 can be miniaturized.

The present invention is not limited to the above described embodiment, but for example, a slip-off preventive mechanism similar to that of the first-group barrel may be formed in barrels of groups such as the second-group barrel other than the first-group barrel. Moreover, the technical idea of the above described embodiment may be applied to retractable lens barrels mounted on image pickup apparatuses such as cameras other than digital cameras, and optical equipment such as electronic microscopes and cellular phones.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188423 filed Aug. 17, 2009, which is hereby incorporated by reference herein in its entirety.

What is claimed is:

1. A retractable lens barrel in which pins formed in a barrel member are engaged with grooves formed in a cam ring, and the barrel member is caused to move in a direction of an optical axis by rotation of the cam ring, comprising:
    a cam pin for moving the barrel member;
    a cam groove with which said cam pin is engaged;
    a slip-off preventive pin for preventing said cam pin from slipping off the cam groove; and
    a slip-off preventive groove with which said slip-off preventive pin is engaged,
    wherein in an area close to a retracted position of the barrel member on a shooting permitting area side, said cam groove and said slip-off preventive groove overlap to be shared grooves with which said cam pin and said slip-off preventive pin are engaged.

2. A retractable lens barrel according to claim 1, wherein said slip-off preventive pin is not in abutment with said slip-off preventive groove in a normal usage state where no shock is applied.

3. A retractable lens barrel according to claim 1, wherein said cam groove has a greater depth than a depth of said slip-off preventive groove.

4. A retractable lens barrel according to claim 1, wherein said cam groove and said slip-off preventive groove are constructed to have trapezoidal cross-sections, and said cam pin and said slip off preventive pin are constructed as truncated cones, and
    wherein said cam groove, said cam pin, said slip-off preventive groove, and said slip-off preventive pin construct helicoids.

* * * * *